(12) United States Patent
Hamdar et al.

(10) Patent No.: US 7,459,180 B2
(45) Date of Patent: Dec. 2, 2008

(54) PROCESS FOR MAKING SKID RESISTANT MOISTURE BARRIERS

(75) Inventors: Jamal N. Hamdar, Orland Park, IL (US); Russell A. Victoria, Chicago Ridge, IL (US); Carmen J. Melillo, Wilmington, MA (US); Jyoti Seth, Andover, MA (US); James R. Hansen, Tinley Park, IL (US); Robert Sorrentino, Reading, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 10/426,319

(22) Filed: Apr. 30, 2003

(65) Prior Publication Data

US 2003/0215594 A1 Nov. 20, 2003

(51) Int. Cl.
*B05D 1/12* (2006.01)
*B05D 1/36* (2006.01)
*B05D 1/28* (2006.01)

(52) U.S. Cl. .................. 427/186; 427/180; 427/188; 427/201; 427/428.06; 427/428.14; 428/40.1; 428/141; 428/143; 428/147

(58) Field of Classification Search .............. 428/141, 428/143, 147, 343, 351, 354, 40.1, 42.1; 427/146, 186, 188, 428.06, 180, 201, 428.14; 156/230

See application file for complete search history.

(56) References Cited

U.S. PATENT DOCUMENTS

| | | |
|---|---|---|
| 2,705,209 A | 3/1955 | Rowe et al. |
| 3,245,601 A * | 4/1966 | Hawkins .................. 229/5.84 |
| 3,849,229 A | 11/1974 | Spillane et al. ............. 156/304 |
| 3,965,633 A | 6/1976 | Carroll ........................ 52/309 |
| 4,000,140 A | 12/1976 | Tierney ...................... 260/28.5 |
| 4,032,491 A | 6/1977 | Schoenke .................. 260/28.5 |
| 4,045,265 A | 8/1977 | Tajima et al. ................. 156/71 |
| 4,235,953 A | 11/1980 | Kumins et al. .............. 428/332 |
| 4,302,370 A | 11/1981 | Buse ......................... 260/28.5 |
| 4,345,004 A | 8/1982 | Miyata et al. ............... 428/416 |
| 4,396,665 A | 8/1983 | Rowe ......................... 428/148 |
| 4,488,918 A | 12/1984 | Jofs ............................ 156/79 |
| 4,521,478 A | 6/1985 | Hageman .................... 428/287 |
| 4,585,682 A | 4/1986 | Colarusso et al. ............. 428/57 |
| 4,757,652 A | 7/1988 | Kalkanoglu .................. 52/173 |
| 4,775,567 A | 10/1988 | Harkness ..................... 428/40 |
| 4,791,881 A * | 12/1988 | Iwasaki ...................... 118/244 |
| 4,835,199 A | 5/1989 | Futamura et al. .............. 524/66 |
| 4,868,233 A | 9/1989 | Moran ......................... 524/71 |
| 4,870,796 A | 10/1989 | Hart et al. ..................... 52/409 |
| 4,897,293 A | 1/1990 | Thessen ...................... 428/40 |

(Continued)

FOREIGN PATENT DOCUMENTS

WO WO 97/29256 8/1997

(Continued)

*Primary Examiner*—Patricia L Nordmeyer
(74) *Attorney, Agent, or Firm*—Stephan P. Williams; Craig K. Leon

(57) ABSTRACT

Skid-resistant moisture barriers of the invention, such as house wrapping, waterproofing membranes, and roofing underlayments, have a carrier sheet with polymer nodules deposited thereon through a rotating screen roll or by transfer means such as a gravure roll. Precise coating levels and polymer distribution can be achieved more easily when compared with prior art coating and embossing methods.

9 Claims, 17 Drawing Sheets

U.S. PATENT DOCUMENTS

| | | | |
|---|---|---|---|
| 4,965,977 A | 10/1990 | White | 52/410 |
| 4,992,315 A | 2/1991 | Zickell et al. | 428/41 |
| 5,028,487 A | 7/1991 | Kindt et al. | 428/489 |
| 5,096,759 A | 3/1992 | Simpson et al. | 428/40 |
| 5,096,784 A | 3/1992 | Culbertson et al. | 428/482 |
| 5,399,419 A * | 3/1995 | Porter et al. | 442/35 |
| 5,441,583 A | 8/1995 | Eaton et al. | 156/71 |
| 5,496,615 A | 3/1996 | Bartlett et al. | 428/144 |
| 5,516,817 A | 5/1996 | Slusher et al. | 523/179 |
| 5,687,517 A | 11/1997 | Wiercinski et al. | 52/177 |
| 5,800,928 A | 9/1998 | Fischer et al. | 428/500 |
| 5,869,414 A | 2/1999 | Fischer et al. | 442/398 |
| 5,992,315 A | 11/1999 | Lorenz | 101/128.21 |
| 6,100,317 A | 8/2000 | Liang et al. | 524/69 |
| 6,296,912 B1 | 10/2001 | Zickell | 428/40.1 |
| 6,385,934 B1 * | 5/2002 | Zickell et al. | 52/408 |
| 6,716,778 B1 * | 4/2004 | Hottner | 442/199 |

FOREIGN PATENT DOCUMENTS

| | | |
|---|---|---|
| WO | WO 99/40271 | 12/1999 |
| WO | WO 01/73242 A1 | 4/2001 |

\* cited by examiner

PROCESS FOR MAKING SKID RESISTANT MOISTURE BARRIERS

FIELD OF THE INVENTION

The present invention relates to skid-resistant moisture barriers, and more particularly to moisture barrier films, including waterproofing membranes and roofing underlayments having polymer nodules deposited thereon by rotating screen or transfer roll.

BACKGROUND OF THE INVENTION

A "roofing underlayment" is a waterproofing membrane having a continuous waterproofing adhesive membrane layer supported on a carrier sheet that may be constructed of nonwoven felt or plastic film.

The membrane adhesive is attached to a roof deck before installation of an overlayment that may consist of roofing tiles, shingles, slate tiles, metal sheeting, or the like. The function of the membrane is to seal around roofing fasteners and to protect against damage from ice dams and wind-driven rain. Roofing underlayments are commercially available from Grace Construction Products, Cambridge, Mass., under the well-known trademark ICE & WATER SHIELD®. Numerous other manufacturers also provide roofing membranes under different tradenames, typically of the plastic carrier sheet variety.

Roofing underlayments having plastic carrier sheets are sometimes coated on the back with a slip resistant material such as sand. Such "granular" underlayments were disclosed, for example, in Zickell et al. U.S. Pat. No. 4,992,315 (See also, Mandzu World Patent International Appl. No. PCT/HUO1/00034; International Publication No. WO 01/73242 A1). Granular membranes are sometimes disadvantageous for the reason that their granular surface interferes with the formation of water-tight laps at seams with other membranes. An applicator attempts to form a seam by overlapping one membrane adhesive onto the back (or upper major face) of an abutting membrane. Consequently, the ability to maintain lap integrity is attenuated unless the sand is removed to expose the upper edge of the abutting membrane to permit direct contact with an overlapped adhesive layer.

Roofing underlayments are commercially available having a slip-resistant continuous coating. Roofing underlayments sold under the ICE & WATER SHIELD® brand by Grace Construction Products, Massachusetts, have a waffle design slip-resistant coating that is applied by slot die and then embossed using an embossing roller. This continuous slip-resistant coating provides applicators with the ability to make strong lap seams.

Other continuous coating designs are known. For example, Thessen disclosed in U.S. Pat. No. 4,897,293 a procedure for coating roofing membranes using linear low-ensity polyethylene (LLDPE) adhesive to create a roughened or texturized surface for skid resistance. The LLDPE adhesive is applied at the nip of two calender rolls, whereby one of the rolls is heated above the melting point of the LLDPE and is rotated a relatively low speed, while the other roll is heated to a temperature below the melting point of the LLDPE, and rotated a greater speed than the first roll. The membrane produced by this method is said to have one smooth surface and an opposite surface having a roughened texture.

In U.S. Pat. No. 5,687,517, Wiercinski et al. disclosed a method for making a roofing underlayment having corrugations due to the use of different plastic film layers in the carrier sheet, and coating the sheet using a polymer coating having a lower Young's modulus of elasticity than the outermost of the film layers. The corrugations provide additional surface area to minimize slippage of boots.

In U.S. Pat. No. 6,296,912, Zickell disclosed a roofing membrane having an asphalt-coated woven or nonwoven layer, disposed against the upper surface of the roofing membrane, to minimize slippage.

Against this prior art background, the present inventors believe that a novel underlayment and method are needed by which skid resistance is imparted in an economic and convenient manner.

SUMMARY OF THE INVENTION

In departing from prior art practices, the present invention provides novel skid-resistant moisture barriers, such as waterproofing membranes and roofing underlayments. An exemplary embodiment comprises: a carrier sheet having on one of its major faces a repeating pattern of shapes deposited thereupon through a screen or transfer roll such as a gravure roll, said shapes being defined by or containing one or more polymer nodules formed by said screening or transfer roll.

Where the moisture barrier is a waterproofing membrane or roofing underlayment, the carrier sheet has a continuous waterproofing adhesive layer on the major face opposite that of the polymer nodules.

An exemplary process of the invention involves extruding polymer material as a hot melt (e.g., elastomeric material) through a rotating screen cylinder onto carrier sheet stock as it is advanced between the nip between the screen and another cylinder which is optionally a chill roll. A plurality of polymer nodules, thus attached to the carrier, may be surrounded by uncoated surface portions of the carrier sheet or they may otherwise project from a base coating polymer layer.

In another exemplary embodiment of the invention, the polymer nodules are deposited onto the substrate carrier sheet by a transfer process, most preferably through the use of a gravure roll. The gravure roll has a circumferential outer surface with an image portion and non-image portion. The image portion is defined by cells that are etched, incised, or indented in a pattern or repeating array below the circumferential surface of the gravure roll. The non-image portion which does not contain cells is wiped continuously with a doctor blade to facilitate entry of the hot melt into the cells and to remove excess polymer. The use of the doctor blade also ensures that the polymer in the cells does not exceed the theoretical maximum volume of the individual cells; and hence the gravure roll/doctor blade combination helps to realize precise coating in terms of polymer coverage on the surface of the carrier sheet.

As the gravure roll rotates against the substrate carrier sheet, the polymer material is drawn out of the cells onto the carrier sheet by capillary action and/or surface tension. Accordingly, polymer material is screened onto the substrate carrier sheet, creating thousands of tiny cells which, either by themselves or in a cell cluster, may be formed into dots, squares, diamonds, grid lines, or other shapes.

In preferred processes of the invention, the doctor blade can be adjusted so that a very thin film of polymer is wiped across the non-image surface portion of the gravure roll, where it remains as a residue and can be transferred onto the substrate carrier sheet in order to provide a thin base coating.

Moreover, the temperature of the hot melt polymer and/or the gravure roll can be adjusted, so that the hot melt material in the gravure roll cells is sufficiently sticky that some of the polymer material remains at the bottom of the cell. This can provide some interesting and beneficial results. For example, diamond/square or grid line pattern images are often incompletely filled in with polymer, such that many microscope nodular polymer portions can be seen to constitute the pattern image or outline. Hence, while the polymer nodules may have a general pattern of repeating diamonds, squares, or lines (as in a grid), the individual nodules are preferably irregular in nature in that they appear incompletely filled in, such that their uppermost surface appears similar to beaded liquid droplets or runnels (particularly under microscope). In this manner, substantially less polymer may be coated onto the carrier sheet while still achieving a satisfactory skid-resistant property, due to the rippled effect which can be detected by hand and seen under microscope.

One advantage of using a screen or gravure roll is the ability to deposit polymer onto the substrate carrier sheet at low application rates that can be fairly accurately controlled (in terms of nodule height and coverage rate). Another advantage is that the gravure process combines the "coating" and "patterning" in one step, rather than in two successive steps as is the case with the coating and embossing methods in current use. A still further advantage is that the screening or transfer roll processes facilitate the formation of nodules with a "pull away" effect, whereby the polymer is stretched in a direction perpendicular to the surface of the carrier sheet, much like pulled taffy, and this is believed to contribute to the improved skid resistance that can be felt by hand on samples made by the exemplary processes of the present invention.

Accordingly, exemplary polymer nodules of the invention may have a body shape that appears, when viewed under microscope, as a frozen liquid droplet. Accordingly, they may have a broad-shouldered and generally circular base for firm bonding with the carrier sheet, while an upper neck portion of the nodule body tapers upward into a thin thread. This tapering is also due to a gradual pull-away effect, as the carrier substrate, which is preferably a plastic film, is advanced through the cylinder nips. Such polymer nodules may be spaced apart on the carrier surface and yet provide excellent traction for workmen's boots.

Preferred embodiments of the invention have polymer nodules arranged as a repeating pattern of images, such as diamonds/squares, grid lines, etc. Spaces between the nodules may be coated or left uncoated, and preferably allow tight overlaps between adjacent underlayment membranes at seams.

In exemplary gravure processes, a doctor blade can be used to facilitate entry of the polymer into cells on the gravure roll surface, and to wipe over polymer such that a residual coating remains which can be transferred from the gravure surface to provide a base coating polymer layer on the substrate carrier sheet.

In further exemplary gravure processes, the gravure roll may have cells having at least two different cell average depths. For example, a plurality of cells having an average depth of 0.75-3.0 mills can be used for transferring a patterned image onto the carrier, while a plurality of cells having an average depth of 0.25-1.5 mils can be used for applying a base coating layer (for surrounding the images of the pattern being deposited).

In still further exemplary methods and articles of the invention, finely divided particulate material, such as sand (0.1-1000 microns average particle size), is embedded into the surface of the polymer nodules, such that the nodules are coated to enhance skid resistance when the article is installed on a building surface. Preferably, this is accomplished by sprinkling sand or dust onto the polymer nodules after the polymer is transferred onto the back of the carrier sheet and while the polymer is in a thermally softened state.

In yet further exemplary methods and articles of the invention, strips of nonwoven material or other fabric can be embedded into the polymer nodules instead of, or in combination with, the finely divided particulate material (e.g., sand), as an alternative method to improve skid resistance.

Further advantages and features of the invention are described hereinafter.

BRIEF DESCRIPTION OF THE DRAWING

In the course of the following description, reference will be made to the drawings, provided for illustrative purposes only, wherein.

DETAILED DESCRIPTION OF PREFERRED EMBODIMENTS

The term "sheet-like," as used herein, refers to materials that can be rolled up, transported, and unrolled in the manner of a sheet. This invention pertains to sheet-like moisture barriers and waterproofing membranes. The term "moisture barrier" includes sheet materials, such as felts, spunbonded materials (e.g., polypropylene), and the like which are customarily used in the building trade for house wrap. Also included are waterproofing membranes having a continuous "pre-formed" pressure-sensitive waterproofing adhesive layer that, in contrast to hot-applied mastic compositions, retains its layer shape in ambient temperatures and is operative to adhere to building surfaces (e.g., foundations, decks) and civil engineering structures (e.g., pipes, bridges, tunnels, etc.).

Figure 1:
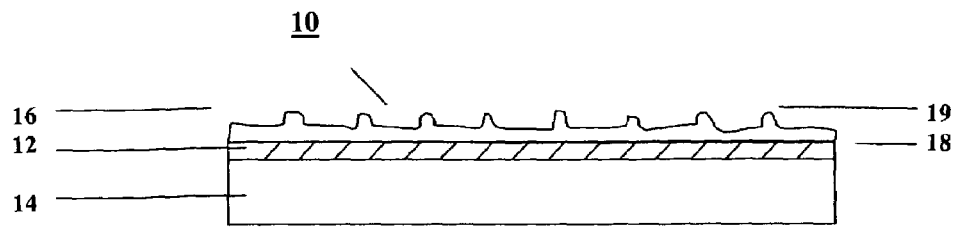
FIG. 1 is a cross-sectional diagram of a PRIOR ART roofing underlayment wherein a slip-resistant coating is applied and then embossing by an embossing roller.
Figure 2:
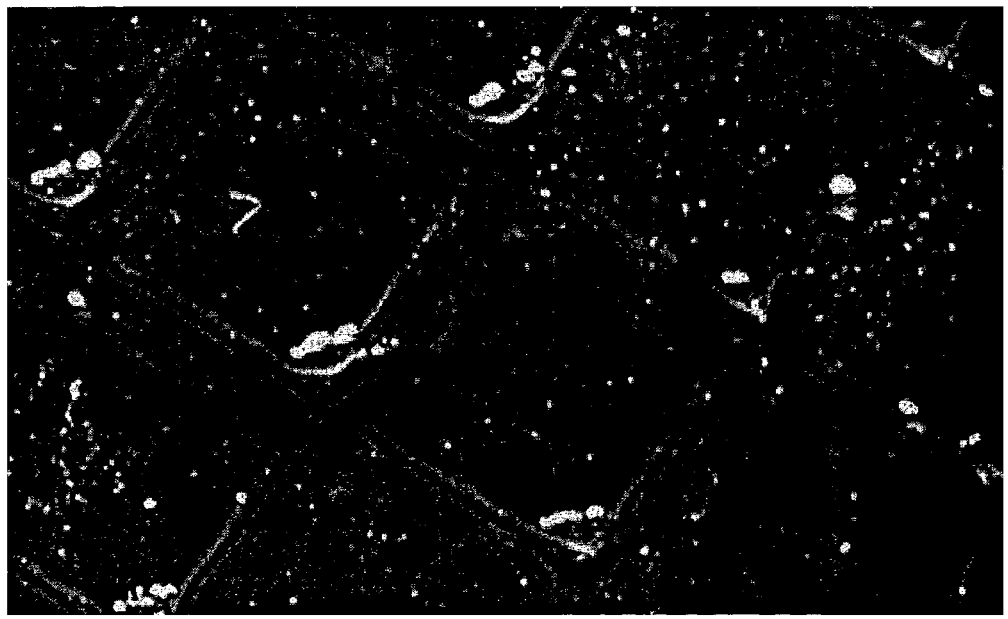
FIG. 2 is a photograph taken through microscope of a PRIOR ART roofing wherein a slip-resistant coating is applied and then embossing by an embossing roller.

As shown in FIG. 1, a PRIOR ART sheet-like roofing underlayment 10 is constructed using a carrier sheet 12, a continuous waterproofing adhesive layer 14, and a continuous skid-resistant coating 16 is coated and then embossed on a carrier sheet 12 using an embossing roller. The coating 16 has a continuous base 18 layer and elevated portions 19 that define a grid or waffle design, as more evidently seen in FIG. 2, viewed under magnification of a light microscope (10-15× magnification). Light-reflecting globular masses of coating material can be seen in the corners of the grids, evidence of excess coating material that builds up on the embossing roller.

Figure 3:
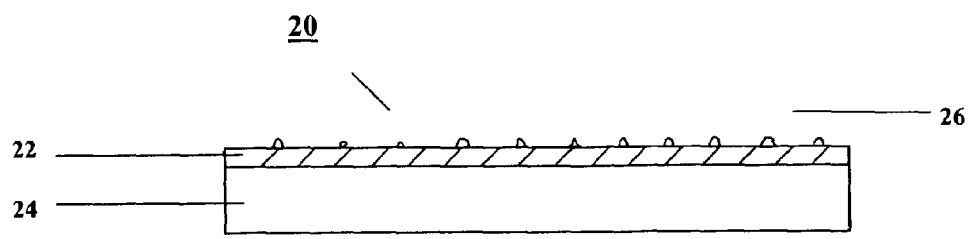
FIG. 3 is a cross-sectional diagram of an exemplary embodiment of the present invention wherein polymer nodules are deposited onto a carrier sheet through a screen.

As shown in FIG. 3, an exemplary sheet-like moisture barrier 20 of the present invention comprises a carrier sheet 22 (e.g., plastic film, coated suponbonded polypropylene, felt) and, on a major face thereof, a plurality of polymer nodules 26 set forth in a repeating pattern of images (e.g., diamond, squares, lines).

Particularly preferred are waterproofing membranes, such as roofing underlayments, wherein the carrier sheet 22 has a continuous pressure-sensitive waterproofing adhesive layer 24 on the major face opposite the polymer nodules 26 which are melt-deposited on a polyethylene film in a repeating pattern. These nodules are here shown separated from each other by uncoated carrier sheet 22, but they can also be deposited onto or along with a continuous polymer coating/base layer. The membrane preferably is shipped having a release sheet (not shown) such as a waxed or siliconized paper to protect the waterproofing adhesive 24 layer. The release sheet is removed prior to installation. It is expected that the carrier sheet 22, waterproofing adhesive 24, and release sheet can be constructed having thicknesses and materials as employed in the industry. For example, the carrier 22 may be cross-laminated high density polyethylene film (preferably 0.2-20 mils and more preferably 2-10 mils thickness), the waterproofing adhesive may be a rubber-modified bitumen (preferably 5-100 mils and more preferably 10-60 mils thickness); and the release sheet may be waxed paper.

The term "nodule" as used herein to refer to the polymer masses that are screened or transferred (gravure roll) onto the substrate carrier sheet, and that are defined by a small rounded mass of irregular shape. The nodules are not necessarily round themselves but are rounded (few sharp edges or creases) due to the hot melt material, which tends to bead or puddle, particularly on plastic films or coated fabrics. The nodules may or may not be entirely discrete (i.e., separated from other nodules) and are preferably clustered together form an image of a square, diamond, circle, line, or other shape. The nodules can also be perceived as elevated masses of polymer situated above the coated or uncoated surface of the carrier sheet.

Figure 4:
FIG. 4 is a photograph taken through microscope of exemplary polymer nodules of the present invention deposited in a repeating pattern (line grid) onto a carrier sheet through a rotating screen.

FIG. 4 is a photograph taken through a light microscope (approximately 12-15× magnification) of exemplary polymer nodules, as taught by the present invention, melt-deposited in a repeating pattern onto a carrier sheet, which is preferably a continuous film of cross-laminated high density polyethylene, whereby substantial portions of the polyethylene surface remain uncoated. The polymer nodules were deposited next to either two or four adjacent nodules to define a repeating line grid pattern.

Alternatively, however, the polymer nodules may be deposited onto the carrier sheet such that a continuous polymer base coating is also formed on the carrier sheet due to capillary action and/or surface tension, while the polymer nodules are elevated above this coating layer. This may be accomplished by adjusting the temperature of the hot melt polymer, such that the hot melt polymer material coats (or "wets out") the carrier sheet due to surface tension, or more preferably as a consequence of polymer residue after wiping of the doctor blade over the gravure roll surface.

In further exemplary methods and embodiments, the polymer nodules may be melt-extruded through a screen that has elongated slits, square holes, star-shaped holes, triangular holes, circular holes, or other shapes. Thus, other exemplary polymer nodules of the invention may not necessarily have generally circular bases of attachment to the carrier sheet 22, but may nonetheless taper upward into smaller diameters, possibly into thread-like members, as their nodule bodies extend outward from the surface of the carrier sheet 22. Alternatively, when the polymer nodules are transferred onto the carrier sheet from a transfer roll or conveyor belt, or as another example from a gravure roll (which has cells on its surface), the nodules may have a somewhat less elevated upper surface, one that tends to be irregular in shape due to pull away of polymer material on the transfer roll (e.g., gravure) surface.

In other exemplary embodiments, the carrier sheet may be imprinted with a pattern, lettering (e.g., manufacturer's name and trademark), or coloring, before the polymer nodules are formed or transferred onto the carrier sheet. Preferably, the polymer material is clear or translucent, such that an underlying pattern, lettering, or coloring which is printed on the carrier sheet, is visible or otherwise legible through the polymer material used for forming the nodules and/or the base coating layer.

Exemplary polymer nodules 26 of the invention have a height of 1-30 mils, more preferably 3-20 mils, and most preferably 5-15 mils, as measured from the surface of the carrier sheet 22 upon which they are deposited. The height of the nodules 26 is also preferably between 100-700% of the average thickness of the carrier sheet 22, and more preferably between 300-500%, and most preferably between 300-400%, based on the average sheet thickness.

In other exemplary embodiments, the average height of the polymer nodules is not less than 100% and not greater than 1000% based on the average thickness of the carrier sheet.

The present invention can help to achieve a savings reduction of at least 20%, and possibly up to 75%, when compared to membranes of the prior art wherein the skid-resistant coating is applied as a thick coating and then embossed. For example, the continuous embossed skid-resistant polymer coatings on presently available commercial roofing underlayments have an average coating weight of approximately 25-34 grams per square meter (GSM) up to 54.4 GSM. It is possible that overall polymer coating weights provided by the present invention can achieve lower average coating weights below 25 GSM without loss or substantial loss of skid resistance. Thus, a preferred coating rate for methods of the present invention is between 5-35 GSM, and more preferably between 7-20 GSM.

Figure 5:
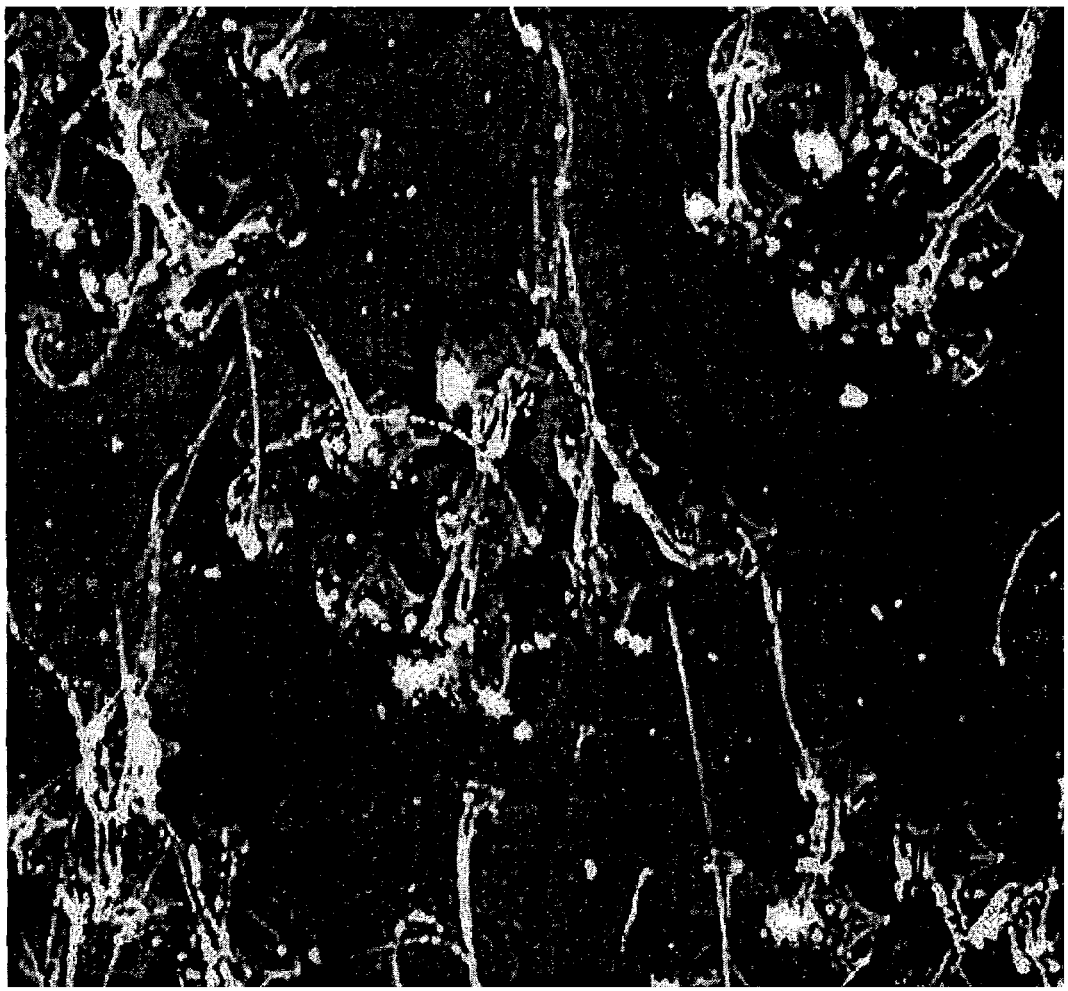
FIG. 5 is a photograph taken through microscope of another exemplary embodiment of the present invention wherein polymer nodules are deposited onto a carrier sheet through a screen as a repeating pattern of clustered nodules.

FIG. 5 provides a microscope view (photographed at 12-15× magnification) of another exemplary pattern of polymer nodules melt-extruded onto a plastic carrier sheet through a rotating screen. In this microphotograph, a cluster of nine polymer nodules are deposited onto the carrier in a repeating pattern, such that rows and columns are defined. Such rows and columns may be aligned in parallel fashion with the edges of the carrier sheet, but more preferably they are aligned in a diagonal fashion such that the grid cluster can be deemed to present a "diamond" profile pattern. Between the nodule clusters, a substantial portion of uncoated carrier sheet surface remains exposed. In fact, the nodules themselves are sufficiently spaced apart from each other, such that the generally circular outlines of their base of contact with the plastic carrier sheet can be perceived. The polymer nodules can also be seen to have wide circumferential shoulder portions, because their bodies quickly taper upwards, forming a thinner neck, and eventually assuming the shape of threads. The polymer nodules are preferably translucent, such that they have a jewel-like quality when viewed under reflective light (as seen in the microscopic view of FIG. 5).

The extent of the tapering will depend on a variety of factors, it is surmised, such as the nature of the polymer being extruded, the melt temperature of the extrusion, the size of the screen holes through which the polymer is extruded onto the plastic carrier, the surface nature of the plastic carrier and speed of the rollers, and the temperature of the chill roller.

Exemplary polymer nodules of the present invention which have been applied onto the carrier sheet through a screen may have, for example, a base with a general average diameter (if generally circular in shape) or average width (if irregular in shape or overlapping with adjoining nodules) of 0.01-1.0 mm and more preferably 0.07-0.7 mm. For example, a grid pattern of polymer nodules, as shown in FIG. 4, can be deposited having two to three grids per two lineal centimeter; with approximately five spaced-apart polymer nodules defining each side of a grid square (from corner to corner).

Exemplary clusters of nodules of the invention, whether applied directly through a screen or transferred onto the carrier sheet using a gravure roll or other transfer means, may be arranged so as to form various aggregate shape profiles. Preferred are the diamond and grid profile shapes. Other shapes may also be effectively used to provide skid resistance as well as aesthetic appearance: such as triangular shapes, rectangular or square shapes, conical shapes, dash and dot combinations, lines formed by nodules, and the like.

If high density polyethylene film or other high hydrophobic material is used in the outer surface of the carrier sheet, such hydrophobic materials may facilitate drainage of water from the surface of the membrane if left uncoated by polymer material.

Whether or not the carrier sheet is coated over all portions by a continuous polymer coating layer, it is preferable to provide polymer nodules in a repeating pattern, and more preferably in a pattern of clusters containing at least 2-30 and more preferably at least 4-25 nodules per cluster. Preferably, the clusters will have 3-36 nodules per square centimeter, and more preferably at least 4-25 nodules per square centimeter.

Figure 6:
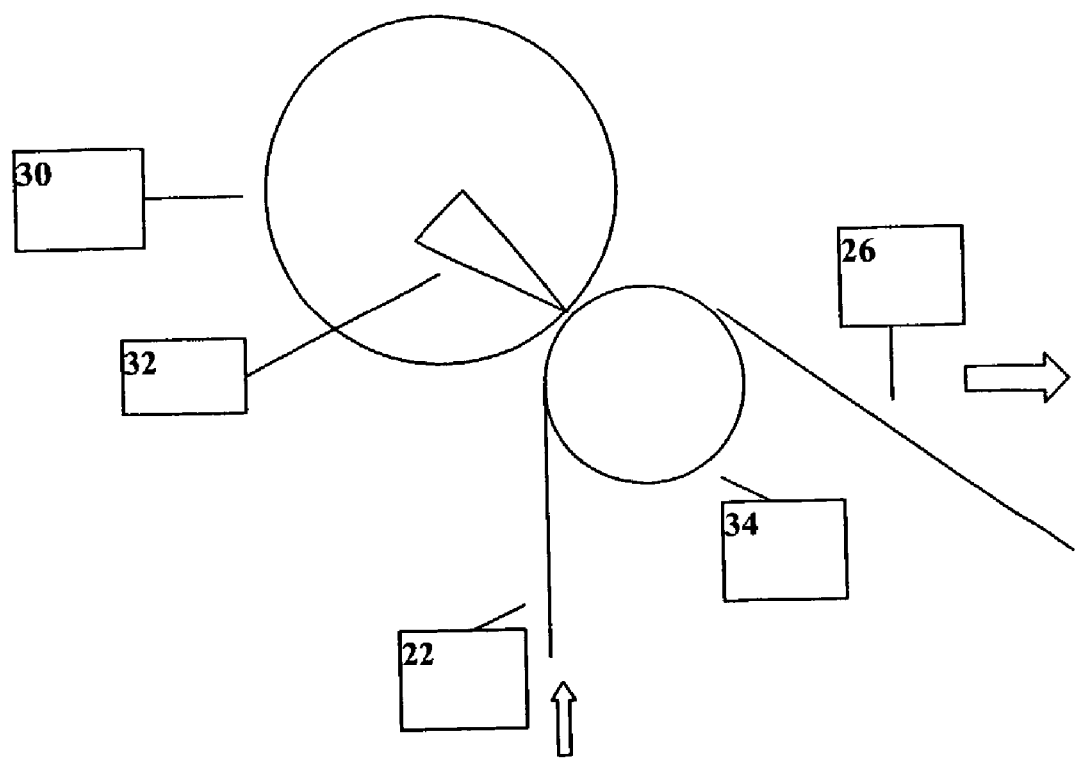
FIG. 6 is a plan diagram of an exemplary process of the present invention for depositing polymer nodules onto a carrier sheet.

FIG. 6 illustrates an exemplary method for depositing a slip-resistant material onto a carrier sheet. A hot melt polymer material is extruded 32 through a die located within a rotatable screen 30 having openings arranged in a pattern. For example, the polymer material can be melt-extruded through a slot die (represented at 32) disposed against the inner surface of the screen cylinder 30, or alternatively flowed into the rotating screen cylinder 30 and forced through the screen openings by a blade device (represented alternatively at 32). The carrier sheet 22, preferably a continuous plastic film or fabric, is advanced through the nip between the rotatable screen 30 and an opposed rotatable cylinder 34, which is preferably a chill roll. The polymer material attaches to the carrier sheet 22, and the resultant polymer nodules 26 emerge from the nip between the cylinders 30/34. Once the nodules 26 are deposited, the carrier sheet 22 may be stored on a take up roll (not shown) or advanced to a next manufacturing stage wherein the continuous pressure-sensitive waterproofing adhesive layer (See 24 in FIG. 3), preferably already covered by a release sheet, is attached.

It is not preferable to coat the waterproofing adhesive directly onto a plastic carrier sheet, due to possible damage or distortion to the plastic material, although this might conceivably work better if the carrier were constructed of a nonwoven or woven fabric that is less susceptible to thermal deformation. It is better to pre-form the waterproofing adhesive layer 24 by melt-extruding or melt-coating the adhesive onto a release sheet (e.g., waxed or siliconized paper) to form a laminate; then the waterproofing adhesive 24 can be attached at a later time to the plastic carrier sheet 22 on the face opposite the polymer nodules 26.

Although plastic films are preferred for use in exemplary carrier sheets 22 of the invention, other materials can be employed. For example, the carrier 22 may be constructed of woven or nonwoven fabric, metal foil, a plastic film or film laminate, a latex-impregnated paper, or combination thereof, optionally reinforced with a scrim or other film layers. As previously mentioned, a preferred carrier sheet for waterproofing membranes and roofing underlayments is constructed from a cross-laminated high density polyethylene, although low density polyethylene, propylene, polyvinyl chloride, and other materials (such as those having oil barrier properties as further discussed below) may also be employed. The carrier sheet 22 may optionally be constructed using two or more different material layers. For example, a cross-laminated polyethylene film may be used for the uppermost surface within the carrier sheet (which terms includes a carrier laminate having more than one layer) while an oil barrier layer can be used between the waterproofing adhesive layer 24 and polyethylene film, so as to minimize or prevent the migration of oils from the waterproofing adhesive 24 into or through the uppermost polyethylene layer. Exemplary oil barrier layer materials include polyvinylidene chloride, polyethylene terephthalate, polyamide, polyvinyl acetate, and polyacrylonitrile. Known tie layer adhesives can be used for adhering together different sheets or films to make the carrier sheet 22. For example, resins sold under the tradenames PLEXAR® from Quantum and BYNEL™ from DuPont are believed to be suitable for this purpose.

Further exemplary carrier sheets 22 may comprise pigments (e.g., titanium dioxide, carbon black); light absorbers (e.g., benzotriazoles); light stabilizers (e.g., hindered amines, benzophenones); antioxidants (e.g., hindered phenols); fillers (e.g., calcium carbonate, silica); plasticizers (e.g., napthenic or aliphatic oil); rheological additives, or mixtures thereof, as known in the art.

Exemplary polymer materials useful for depositing the skid-resistant polymer nodules onto the carrier sheet 22 preferably have a lower Young's modulus of elasticity than the material comprising the carrier sheet 22. The polymer material may include, for example, a resin such as atactic polypropylene, polyethylene vinyl acetate, polyvinyl acetate, polyethylene (e.g., LDPE, LLDPE, HDPE, and blends thereof), ethylene-propylene co-polymer, or mixtures thereof. The polymer material may optionally contain a plasticizer, such as naphthenic or aliphatic oil; and/or a tackifier such as a $C_5$ or $C_9$ hydrocarbon resin, a mixed $C_5$ and $C_9$ hydrocarbon resin, a rosin ester, a coumarone-indene resin, a polyterpene, or mixture thereof.

Generally, waterproofing membranes employ adhesives that are known in the industry. Pressure-sensitive rubberized bitumen (asphalt) adhesives which do not require heat for application to roof decks are preferred. The bituminous, adhesive composition comprises a mixture of a bituminous material and natural or synthetic polymer, preferably a rubber or other elastomer polymer. The term "bituminous material" as used herein includes compositions containing asphalt, tar such as coal tar, or pitch. The bituminous adhesive may be reinforced with fibers and/or particulate fillers. In addition to any oils normally present in the bitumen, the adhesive composition may also contain a conventional extender component such as an aromatic oil. The preferred polymer component is rubber which may be virgin rubber or a synthetic rubber (e.g., SBS, SBR) blended into the bitumen, and preferably extender oil at an elevated temperature, to form a smooth mix. The bituminous adhesive layer 24, at least at its surface remote from the carrier sheet 22 is preferably pressure sensitive and tacky at normal ambient temperature in order that it be self-adhesive to the substrate surface (e.g., roof deck). A bituminous material, when used as the continuous waterproofing adhesive layer 24, is elastic and self-seals against punctures and around nails and other roof fasteners at high and low temperatures. Synthetic adhesives, such as butyl adhesives, are also known and can be used as the waterproofing adhesive membrane layer 24. As previously mentioned, the thickness of the waterproofing membrane adhesive layer 24 is preferably 5-100 mils thick, and more preferably about 10-60 mils thick.

The waterproofing adhesive layer may optionally incorporate a scrim or mesh for support, either in the middle of the adhesive layer or along the surface that will be placed onto a building surface. The waterproofing adhesive layer may also contain filler materials, such as recycled plastics, crumb rubber, polymer or cellulosic fibers, and/or other fillers.

Preferably, the total transverse thickness of the carrier sheet 22 is in the range of 0.2-20 mils, and more preferably in the range of 0.5-10.0 mils depending upon the film or film materials chosen 22. Another exemplary carrier sheet 22 may comprise, for example, at least one polypropylene (PP) layer sandwiched between two linear low density (LLDPE) or low density polyethylene (LDPE) layers, the ratio of a single layer of PP to a single layer of polyethylene thickness is preferably about 2:1-10:1, and more preferably about 5:1. In further exemplary underlayments 10 of the invention, the carrier sheet 22 can comprise at least two different polymers selected from the group consisting of high density polyethylene, low density polyethylene, linear low density polyethylene, polypropylene, polyethylene terephthalate, polyamide, polyvinyl chloride, polyvinylidene chloride, polystyrene, and ionomer resin.

In other exemplary embodiments of the invention, a waterproofing membrane is provided having polymer nodules 26 deposited onto a major face of a carrier sheet 22 using a transfer process. Thus, in exemplary methods, the polymer material can be applied onto the surface of a transfer roller or belt that transfers the polymer material onto the carrier sheet, whereupon a plurality of polymer nodules is formed. Preferably, the transfer roll or belt has cavities or indentations, so that melt extruded polymer may be molded into a desired shape, such as a square, rectangular, conical, star, or other three-dimensional shape. It would be preferably to use a release coating (e.g., tetrafluoroethylene fluorocarbon polymers) suitable for molding and extrusion purposes, to permit the molded polymer nodules to be released from the transfer roll during the transfer process.

As previously mentioned, still further exemplary methods and membranes of the invention involve finely divided particulate material, such as sand (0.1-1000 microns average particle size) embedded as a coating onto the surface of the polymer nodules. This is believed to enhance skid resistance and provide further frictional properties when the membrane is installed on a building surface. Preferably, this is accomplished by sprinkling sand or dust onto the surface of the polymer nodules after the polymer is melt-applied through the screen onto the carrier sheet and is thus in a somewhat thermally softened state. The sand can be applied using any means known, such as through perforations of a rotating cylinder. Optionally, a nip roller can be used subsequently to embed the coated particulates deeper into the surface of the polymer nodules, and a vacuum device can be used to remove excess particulates.

The use of finely divided particulate material for roofing underlayments and waterproofing membranes is known. For example, U.S. Pat. No. 5,496,615 of Bartlett et al. disclosed the use of particles, by which term was meant granules, powders, dust, or ground material, including sand, calcium carbonate, cement (hydrated), talc, titanium dioxide, carbon black, slate dust, granite dust, clay, and the like. These are believed to be appropriate for use in the present invention. Preferred particles are sand or calcium carbonate, in view of availability and low cost. A preferred particle size range is about 0.1-1000 microns, and more preferably the range is about 0.2-100 microns.

In yet further exemplary methods and membranes of the invention, strips of non-woven material or other fabric can be embedded into the polymer nodules instead of, or in combination with, the finely divided particulate material (e.g., sand), as an alternative method to improve skid resistance. Preferably, the strips are applied to the polymer nodule-coated surface of the carrier sheet in the machine direction (with respect to the carrier sheet). The strips are preferably spaced apart from each other at a distance of 5-80 cm and more preferably 20-40 cm apart to ensure that boots or shoes are able come into contact with at least one strip. The fabric strips may comprise woven or knit fabrics, or are more preferably non-wovens (felt or spunbonded) of the kind and in the thicknesses that are already being sold as roofing felts. The fabric strips can be made from materials such as cotton, polyethylene, polypropylene, wool, paper, or the like. The fabric strips may optionally be coated with latex, rubber, or other materials to increase skid resistance. When the membrane is applied to the eve of a roof, the strips are preferably oriented in a horizontal direction, parallel with the roof edge.

Figure 7:
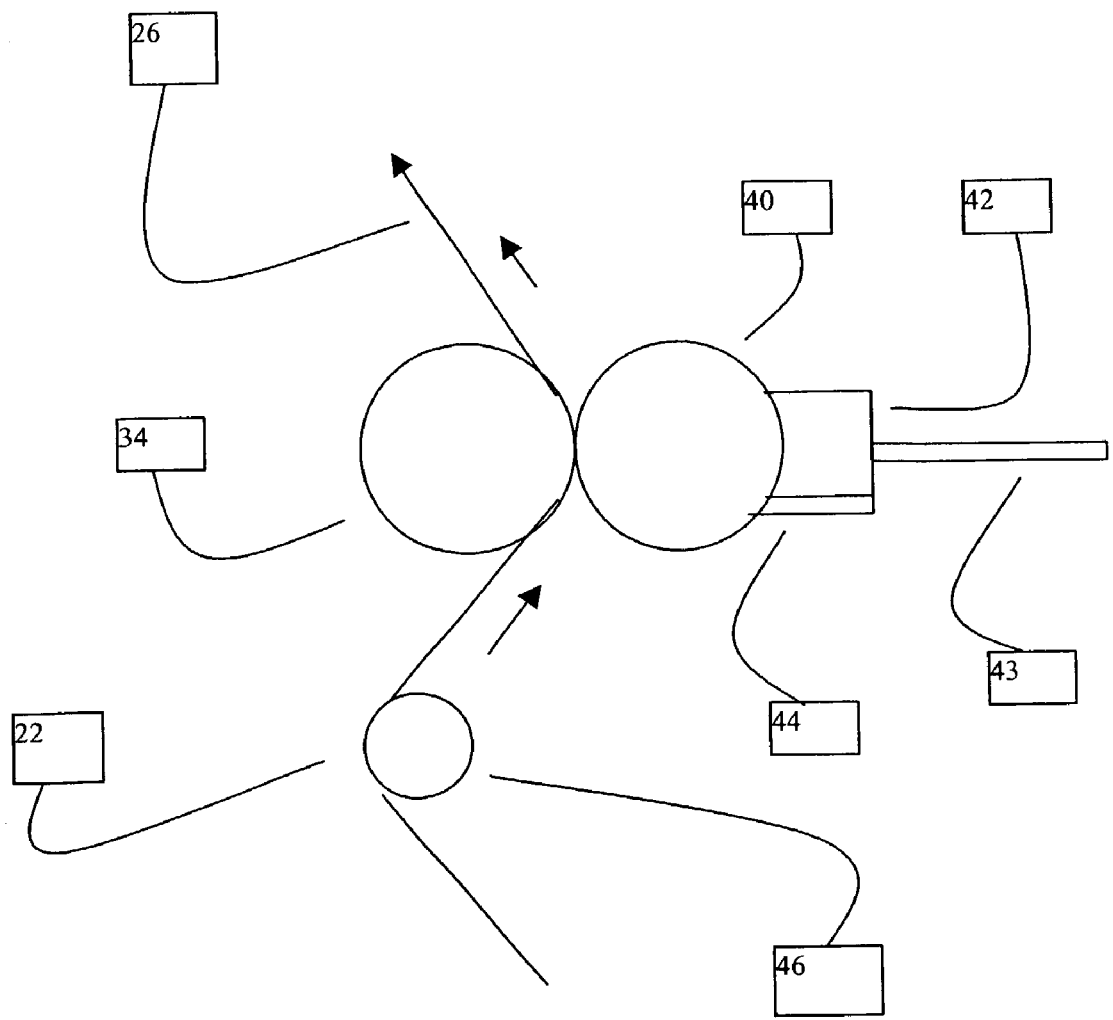
FIG. 7 is a plan diagram of another exemplary process of the present invention involving the use of a gravure roll to transfer hot melt polymer onto a carrier sheet.

As shown in FIG. 7, an exemplary method of the invention, involving the transfer of the polymers onto a substrate carrier sheet, involves the use of a transfer roller such as a gravure roll 40. The use of a gravure roll in the present invention is analogous to an intaglio printing process whereby a design is etched, incised, or otherwise formed in a hard material below its surface so that an impression from the design yields an image or pattern in relief.

An exemplary gravure roll 40 is preferably made of metal, such as copper, or, more preferably, of steel. The roll is preferably coated with ceramic, chrome, or other plating material to improve release from the polymer used as the skid-resistant material. The circumferential outer roll 40 surface has an image portion and non-image portion. The image portion on the surface of the gravure roll is defined by cells (e.g. cavities or indentations) etched or incised in a pattern or repeating array below the non-image portion of the roller surface. The cells can be clustered or arranged to form a design shape, such as a diamond, square, dot, triangle, line, grid lines, or other shape. Exemplary cells may have inverted truncated pyramid shapes, with a depth of 0.25-2 mils, and more preferably about one mil; an average length (along square) of about 1-20 mils, and more preferably about 1-2 mils, with the bottom of the gravure cell being about 10-25% smaller than the size of the hole at the roll surface.

The gravure roll 40 contacts hot melt polymer, such as by rotating through a polymer reservoir 42, and the circumferential surface is wiped with a doctor blade 44 to facilitate entry of hot melt into cells and to ensure that polymer does not exceed the volume of the cells. Preferably, the doctor blade 44 should wipe over polymer on the gravure roll such that a residual thin coating remains which can be transferred onto the substrate carrier sheet. The pressure exerted by the doctor blade 44 onto the gravure roll circumferential surface should be adjusted to achieve this preferred effect, because the present inventors believe it can be used for enhancing skid-resistance of the carrier sheet surface.

In another exemplary method of the invention, the gravure roll may have cells of different depth. For example, the cells used for the printing a diamond/square or grid line image, may be an average depth of 1-2.5 mils, while the areas between these diamond/square and line shapes may have a average depth of 0.5-1.5 mils, such that a base coating layer can be purposefully formed. All cells may be spaced apart from each other at a distance of 0.5-2.0 mils. The use of the shallower cells may allow more accurate or uniform application of a base coating layer than, say, using a loosely adjusted doctor blade. Accordingly, an exemplary method involves depositing polymer onto the carrier sheet using gravure roll having a plurality of cells with at least two different average depths. Similarly, other exemplary methods of the invention involve gravure cells having at least two different average width dimensions and/or at least two average spacing distances between cells. For example, the average spacing distance between cells can be 0.5 and 1.0 mils.

In further exemplary articles of the invention, the polymer nodules may have an average height of 406 mils (measured from carrier sheet) and a base coating of 0.25-0.5 mil average thickness. It is believed that this may be accomplished by using at least two different average cell depths on the gravure roll; such as, for example, using a first plurality of cells having an average depth of 2 mils for making the elevated nodules, and using a second plurality of cells having an average depth of 1 mil for applying the base coat polymer. The cells may have surface opening widths (when measured along the side of a square) of about 0.015 inch, for example, and be spaced apart at an average distance of about 1.0 mil.

As the gravure roll 40 rotates against the substrate carrier sheet 22, which is continuously advanced through the nip between the gravure roll 40 and opposed counter-rotating cylinder or back up roll 34, the polymer material is drawn out of the gravure roll cells by capillary action and/or surface tension onto the carrier sheet 22 at the nip (formed between 34 and 40). In this manner, polymer nodules 26 are formed in a repeating pattern of diamonds, squares, or lines (grid) and transferred onto the surface of the substrate carrier sheet 22/26.

An exemplary gravure roll 40 may have a 4-8 inch diameter, a length of three to four feet, and an inner spirally wrapped tubing within its hollow cylindrical body for conveying a heated medium (e.g., oil at 250-350° Fahrenheit) through the body cylinder. Among the many designs that may be etched (by acid), incised (e.g., cut, drilled), indented, or otherwise formed on or in the surface of the roll 40 include an inverted truncated pyramid or cone cell shape. Such shaped cells receive polymer material and transfer all or a portion of it to the carrier 22. Alternatively, a sheet having perforated patterns, or a screen having openings can be wrapped spirally around the circumference of a roll to obtain a gravure roll.

In further exemplary processes and embodiments of the invention, the repeating pattern shapes (e.g., diamond square or grid line) on the substrate carrier sheet are preferably incompletely filled by polymer mass. Some polymer material can be made to stick in the gravure roll cells, and a pull-away effect can be achieved on polymer masses transferred to the carrier sheet. Thus, exemplary polymer nodules formed by gravure roll may thus comprise high irregular surface features, which appear (particularly under microscope) similar to beading of hot melt polymer (e.g., in the liquid state). These beads or runnels of hot melt material, when viewed under microscope, may themselves be considered to be "micro-nodular" in the sense that they appear to be smaller irregular masses (microscopically discernible) within the larger pattern shape detected by unaided eye.

Figure 8:
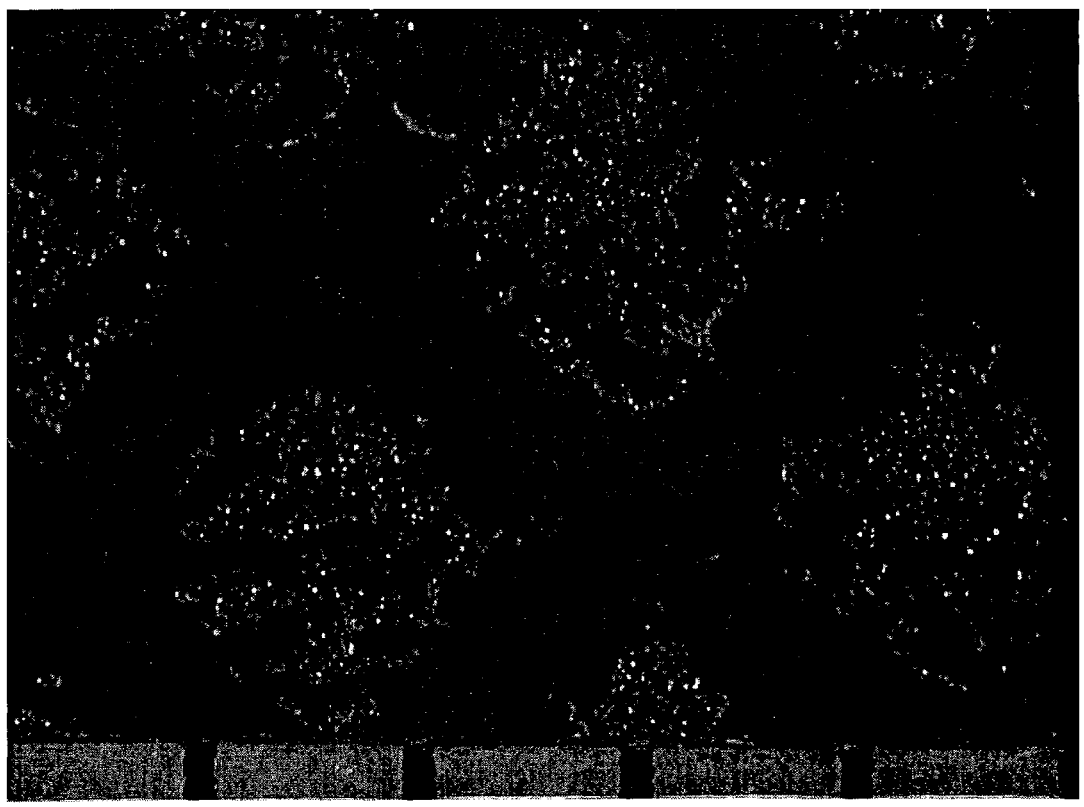
FIG. 8 is a microphotograph taken at low magnification of an exemplary carrier sheet substrate having polymer deposited by gravure roll in a repeating diamond/square pattern.

As seen in the microphotograph taken at low magnification in FIG. 8, an exemplary skid-resistant carrier sheet surface has polymer deposited in a repeating pattern by gravure roll that is wiped continuously by doctor blade. The pattern transferred onto the carrier (in this instance a black polyethylene film) is that of a repeating diamond (square) shape. The diamonds have an average width of about 1.5 mm judging by the 1 mm units of the rule appearing at the bottom of the photograph) and an average distance of 0.5 mm spaced apart. The general shape or outline of the diamonds is not filled in completely by polymer material; the result is that polymer nodules (irregular masses) are found, and these can be seen under microscope to refract light. The lighter coloration of the spaces between the squares (or diamonds) suggests that a fairly uniform microscopic coating layer of polymer remained on the gravure roll surface and was transferred onto the carrier sheet.

Figure 9:
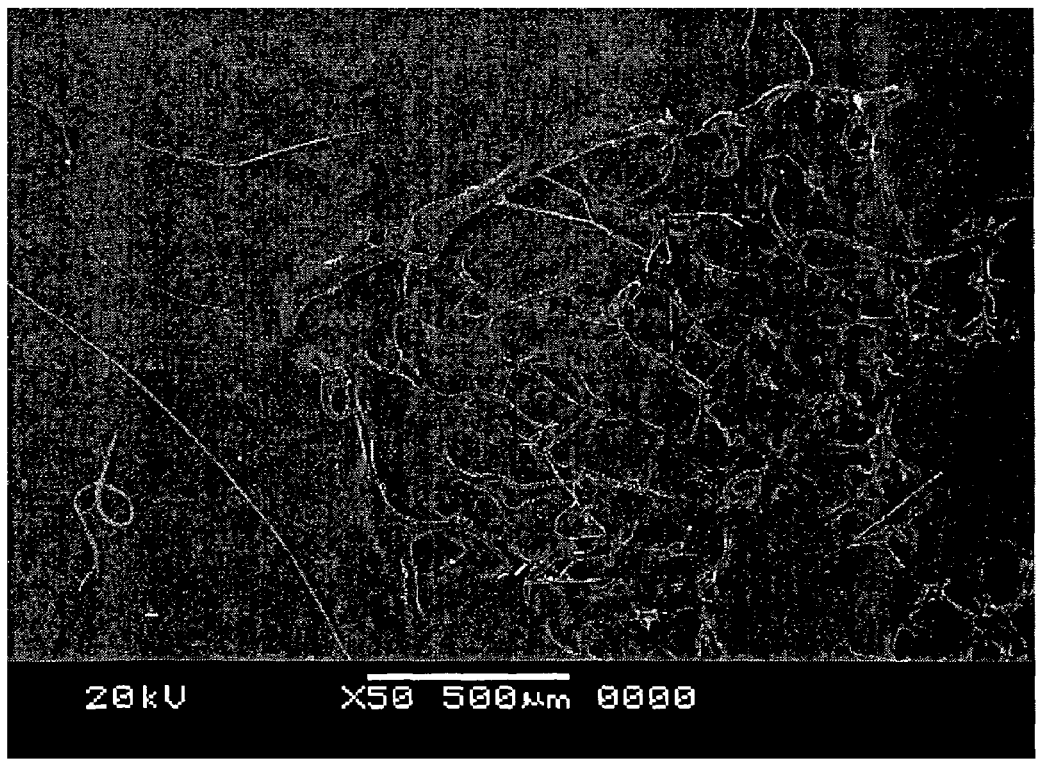
FIG. 9 is a microphotograph taken at (50×) magnification of a surface portion of an exemplary carrier sheet substrate having polymer deposited thereupon by gravure roll in a repeating diamond/square pattern.

FIG. 9 is a microphotograph taken at (50×) magnification of a surface portion of another exemplary polymer covered carrier sheet of the present invention wherein polymer is deposited in a repeating diamond/square pattern onto a black plastic polyethylene carrier film using a gravure roll wiped by doctor blade. In this case, the polymer nodules are generally arranged within a square shape or outline, and are seen elevated prominently above a base coating layer on the carrier sheet. At slightly higher (55×) magnification, in FIG. 10, the "rounded mass" or beading of the polymer is more readily perceived, along with the "pull away" of the polymer in both the elevated portions and base coating areas. At still higher (450×) magnification, in FIG. 11, these "pull aways" are papillary (shorter nipple-like projections) or tendrilous (longer projections that are threadlike) in appearance.

Accordingly, in preferred methods of the invention, polymer is applied onto carrier substrate sheets by gravure roll the outer circumferential surface of which is continuous wiped by a doctor blade, such that a repeating pattern of polymer is applied wherein the polymer forms a repeating pattern of images (e.g., diamond, square, lines, etc.) and further wherein the images are formed of nodules (rounded masses of irregular shape), and preferably wherein the nodules are beaded, papillary, and/or tendrilous in appearance.

Figure 10:
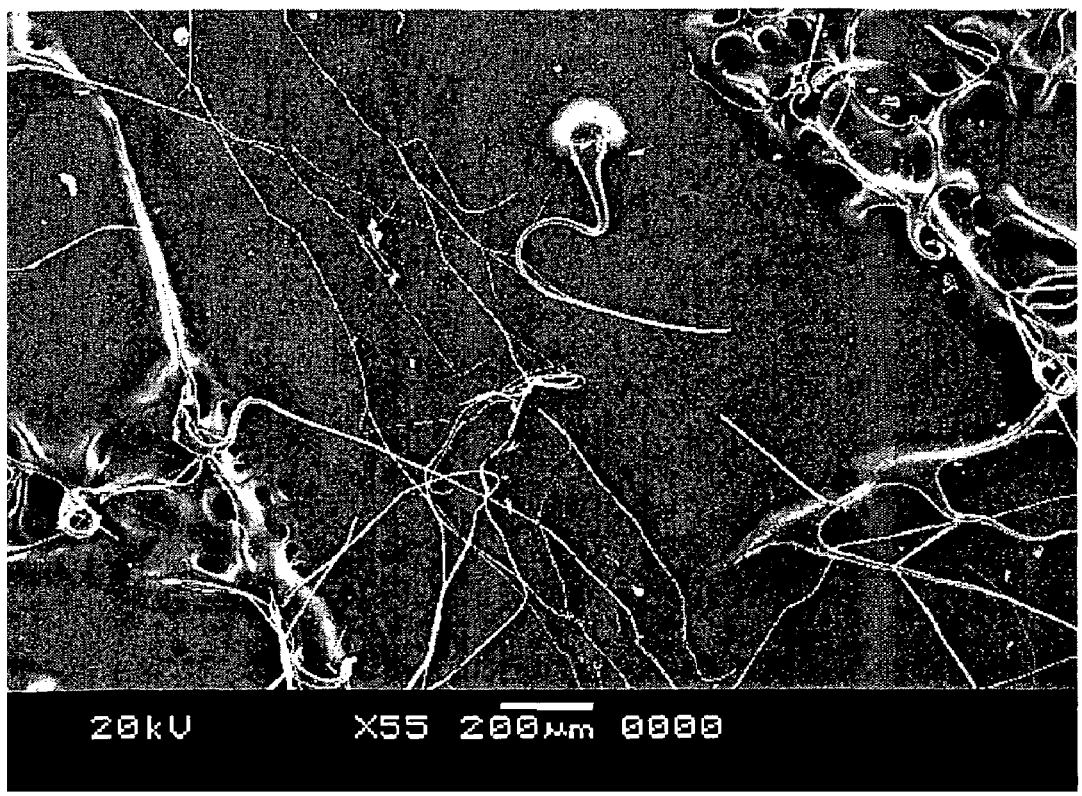
FIG. 10 is a microphotograph taken at (55×) magnification of the polymer deposited on the carrier sheet substrate as shown in FIG. 9.
Figure 11:
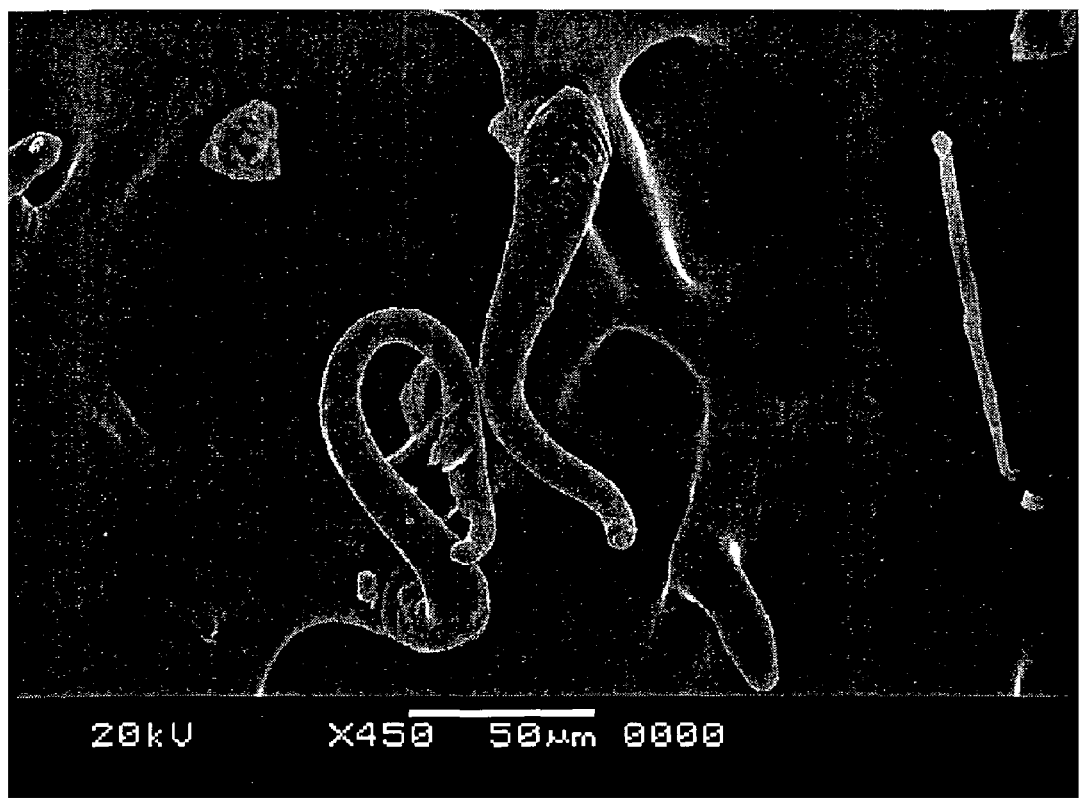
FIG. 11 is a microphotograph taken at (450×) magnification of a portion of the deposited polymer, as shown in FIG. 10, showing a "pull away" effect.
Figure 12:
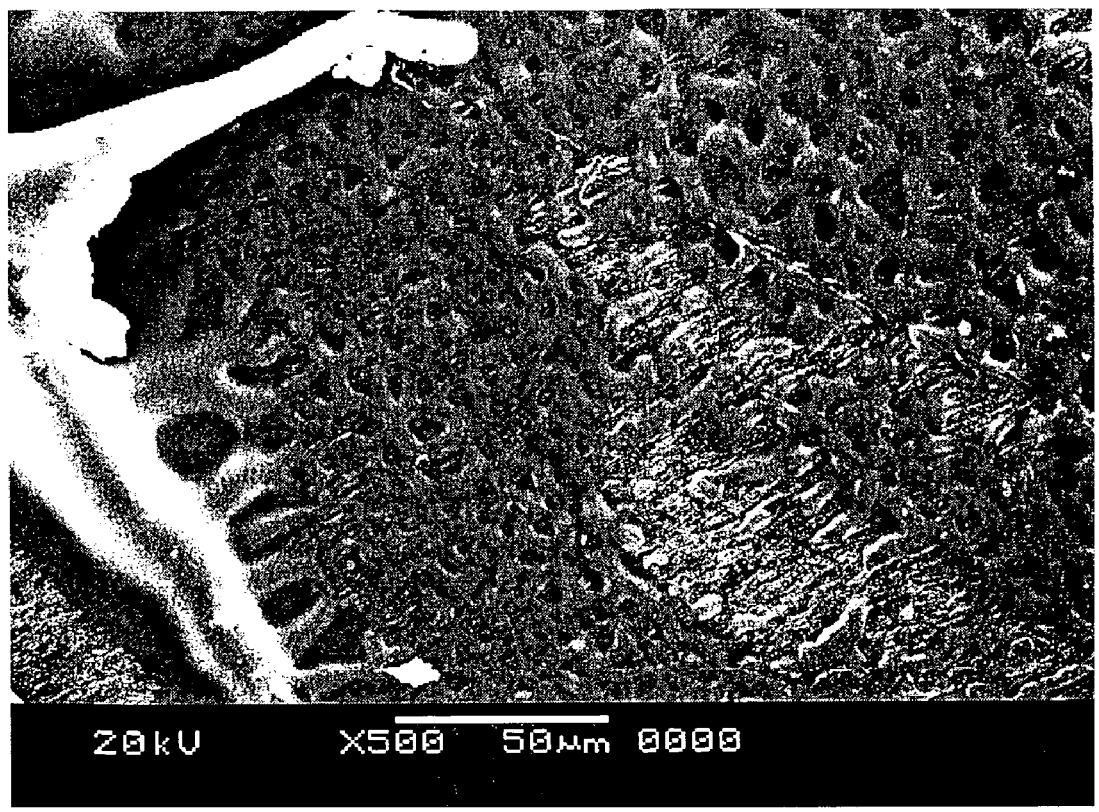
FIG. 12 is a microphotograph taken at (500×) magnification of a portion of the polymer previously shown in FIGS. 10 and 11, wherein a thin rippled polymer coating is observed next to a diamond/square shape.

FIG. 12 is a microphotograph taken at (500×) magnification of a portion of the polymer, previously photographed in FIGS. 10 and 11, wherein a very thin rippled polymer coating is observed in the space next to a diamond/square shape. A tendrilous projection of polymer from the square is easily seen in the upperward left of the photograph. The thin rippled polymer coating is believed to be formed by residual polymer wiped by the doctor blade on the non-image portion of the gravure roll surface.

Figure 13:
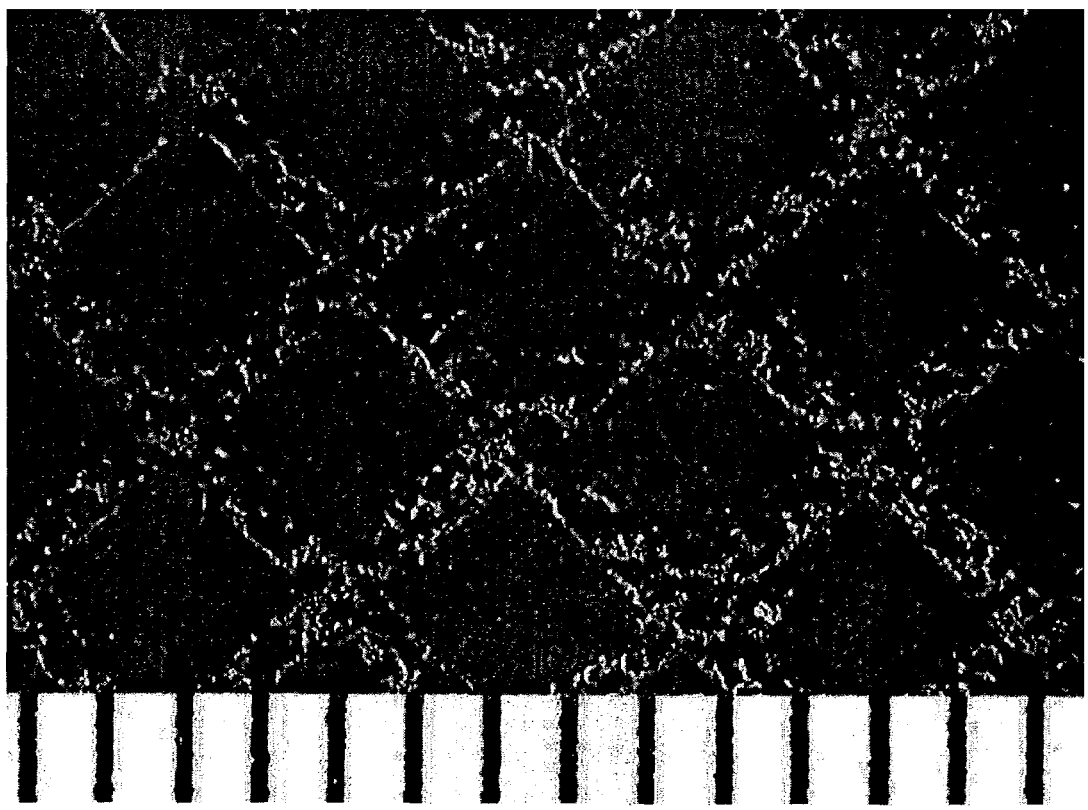
FIG. 13 is a microphotograph taken at low magnification of another exemplary embodiment of the invention wherein polymer is transferred by gravure roll onto a carrier sheet in a grid line pattern.

Another exemplary pattern of polymer applied by gravure roll on the carrier sheet is shown in the microphotograph of FIG. 13. The cells on the gravure roll were arranged so as to transfer an image of grid lines, almost in the reverse image of the squares depicted in FIG. 8. In FIG. 13, the whitish portions of the lines are created by light refracted by beaded (rounded) masses (nodules) of the polymer.

Figure 14:
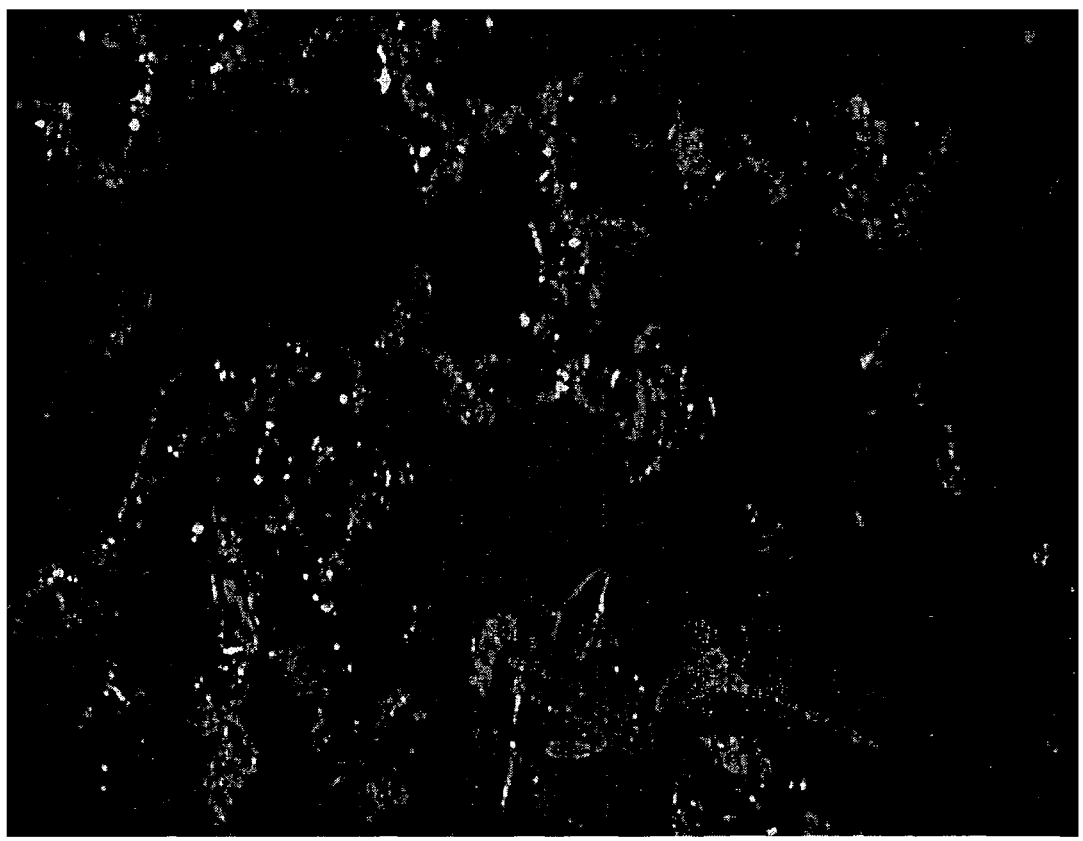
FIG. 14 is a microphotograph taken at higher magnification of the polymer nodules forming the line pattern shown in FIG. 13.

FIG. 14 is a microphotograph taken at higher magnification of another exemplary carrier sheet (black polyethylene film) on which the polymer was patterned using a gravure roll. Although the nodules are irregular in shape and mass, the overall height of the elevated projections and distribution of mass over the carrier surface is fairly uniform. This evidences the ability of gravure roll process to provide uniformity of coverage with precise coating rates, thereby realizing more economical use of polymer material.

Figure 15:
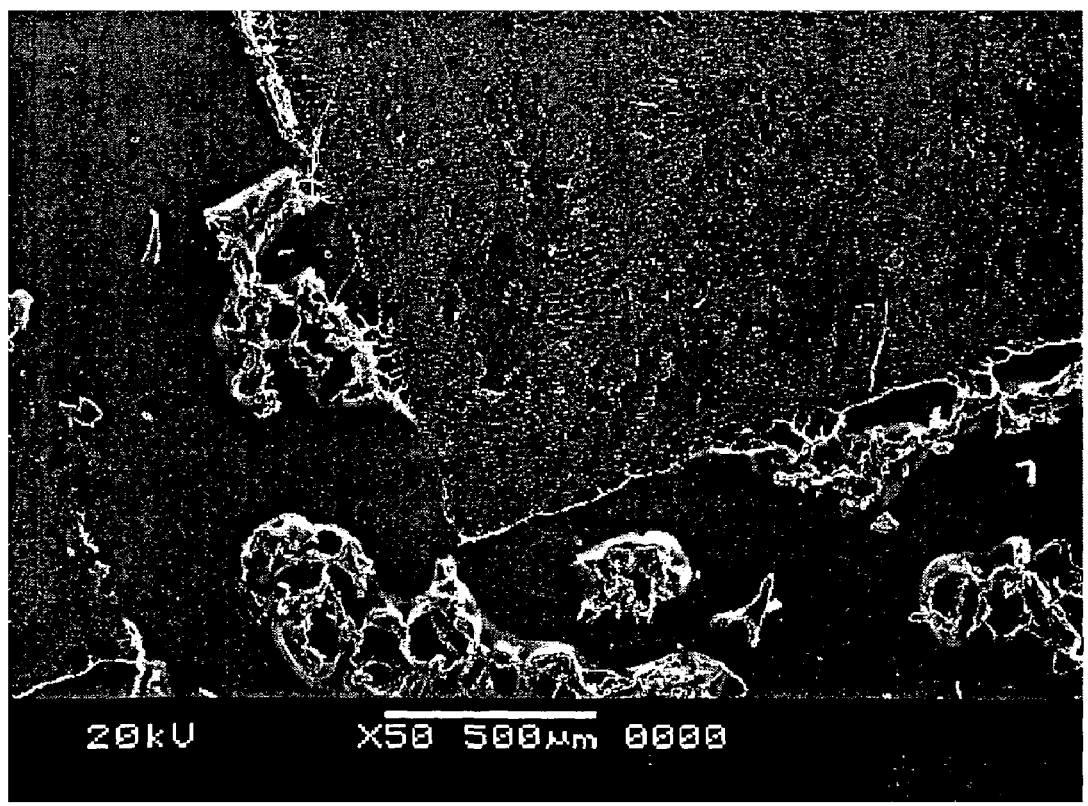
FIG. 15 is a microphotograph taken at (50×) magnification of a portion of an exemplary embodiment of the invention wherein grid lines (having polymer nodules) and thinly coated areas between the grid lines.
Figure 16:
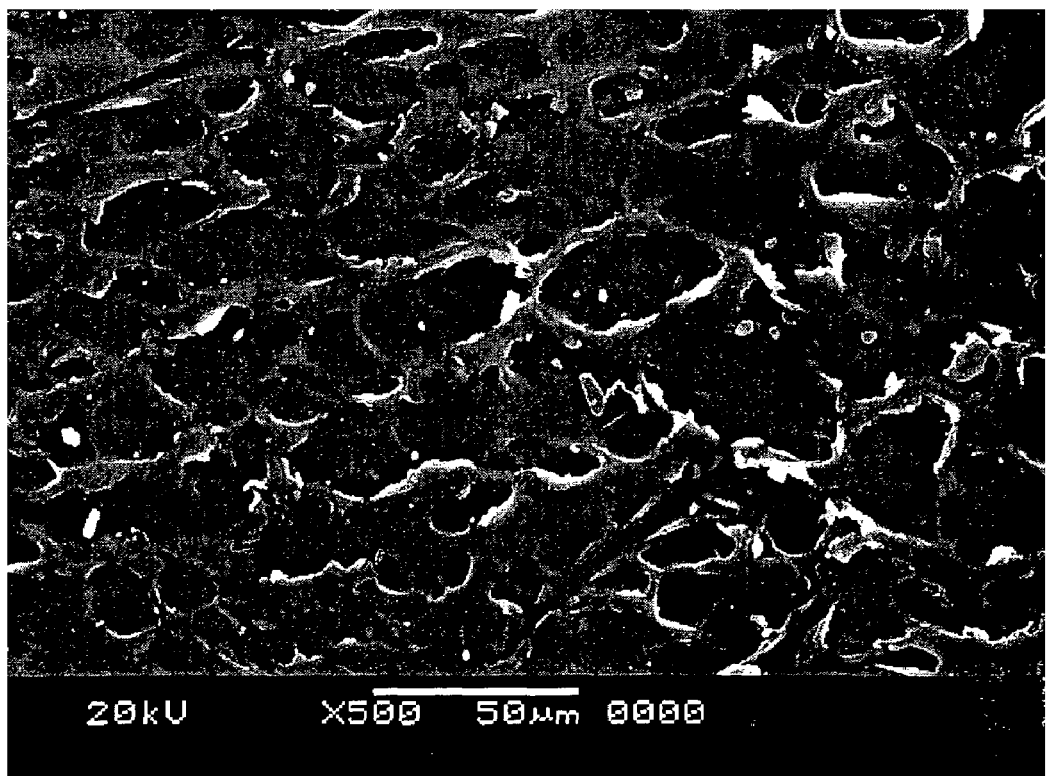
FIG. 16 is a microphotograph taken at (500×) magnification of the thinly coated grid spaces seen in FIG. 15.

FIG. 15 is a microphotograph taken at (50×) magnification of another exemplary embodiment illustrating a portion of grid lines which criss-cross at the lower left bottom of the photograph and a grid space enclosed by lines. Nodules having length of about 200-100 um populate the lines. Smaller nodules populate the areas intervening between the lines; these micro-nodular polymer masses, seen at 500× magnification in FIG. 16, are believed to be formed by the residue polymer wiped over by doctor blade on the non-image surface of the gravure roll and transferred onto the carrier.

The present inventors have found that transfer of polymer onto the substrate carrier sheet, using a gravure roll that is continuously wiped by doctor blade, provides numerous advantages over the prior art coating/embossing method. One advantage is the ability to control more precisely the amount of polymer used. It is believed that the present invention allows less polymer material to be used because the maximum volume of polymer can be controlled by use of the gravure cells wiped continuously by doctor blade. Moreover, the processes of the invention combine "coating" and "patterning" in one step rather than two. Another advantage is the ability to create polymer pull away features rather easily on the carrier sheet surface. For the gravure process in particular, the doctor blade can be adjusted to wipe a relatively thin but uniform film on the gravure roll that is then transferred to the carrier sheet.

Figure 17:
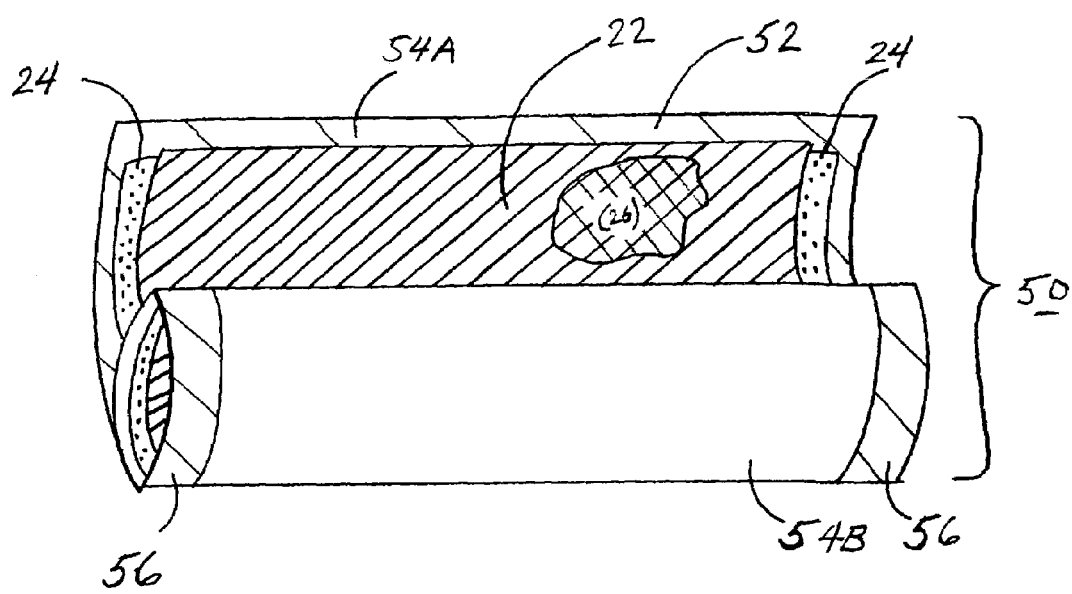
FIG. 17 is an illustration of another exemplary embodiment of the invention.

FIG. 17 illustrates another embodiment of the present invention wherein the edge-to-edge width of the waterproofing adhesive layer 24 extends beyond both longitudinally-extending edges of the carrier film 22, which is shown with a portion of optional but preferred skid-resistant coating (as partially shown in cross-hatching and designated at "(26)" within parentheses). The extension of the waterproofing adhesive layer 24 beyond the edges of the carrier film 22 facilitates the ability of applicators to make water-tight overlaps between adjoining membranes. In other words, the waterproofing adhesive of one waterproofing membrane (e.g., roofing underlayment, moisture barrier for foundation or tunnel) can be positioned conveniently (even repositioned) upon the exposed waterproofing adhesive extending beyond the carrier sheet edges of a previously installed membrane, before the release sheet is removed, due to the presence of the partial coating strips 56 on the back of the release sheet.

It is here observed that in prior art methods of rolling up roofing membranes, a large silicon-coated release paper sheet was previously used having a width that much exceeded the width of the waterproofing adhesive layer so that it could be folded at both edges. The release sheet was folded back along both longitudinally-extending edges to allow the exposed waterproofing adhesive edge (which extended beyond the carrier sheet) to be rolled onto the folded-over-silicon-coated-side of the release sheet edges, when the product was rolled up to be shipped after manufacture. This was done so that the full coating of both sides of the release sheet paper could be avoided.

However, in contrast to the prior art folding method just described above, the present inventors realize that considerable cost-savings may be achieved by using a smaller release paper sheet (less wide) and omitting the folding altogether. Hence, the overall width of the release sheet is decreased, the folding is avoided; and, instead, the edges along the back of the release sheet are coated in order to protect the exposed portion of the waterproofing adhesive (the exposed "bead" extending beyond the carrier film) that is rolled onto the back of the release sheet.

By decreasing the overall width of the release sheet, a small but nevertheless appreciable cost reduction can be realized, and, perhaps more significantly, the convenience of installing the waterproofing membrane, as a roofing underlayment (particularly in the horizontal direction on a deck or sloped roof) is dramatically improved. In addition to claiming the waterproofing membrane, as will follow in the ensuing paragraphs, the present inventors will also describe a method for installing the waterproofing membrane, a method that provides convenience in terms of accurate placement as well as in terms of speedy installation.

Accordingly, FIG. 17 illustrates an exemplary waterproofing membrane 50 of the inventions such as a roofing underlayment (optionally but preferably with a skid-resistant coating), which can be shipped and stored in roll form, the membrane comprising a release sheet liner 52 that is fully coated with silicon or wax only on a first face 54A which is operative for releasably contacting one of the entire faces of the waterproofing adhesive layer, and which is partially coated on the opposite, second face 54B, namely along the longitudinally-extending edges 56 (which edge-coating is operative for releasably-contacting the exposed portion (or "bead") of the waterproofing adhesive during roll-up). The first face 54A is optionally but preferably coated first with a polymer such as polyethylene, polyvinyl chloride, polyvinylidene chloride, or other polymer (for strength enhancement of the paper), this first face 54A having an outer silicon or wax coating layer for releasably-contacting the waterproofing adhesive layer 24. As previously mentioned, exemplary waterproofing adhesive layers 24 comprise a rubber-modified bituminous pressure-sensitive adhesive, as is known in the waterproofing art, and these are extremely tenacious. On the second (or opposite) face 54B of the release sheet 52, it is preferable to coat a silicon or wax coating only along the opposed outer width edges (both designated 56) of the second face 54B, rather than to coat the entire second face 54B, thereby conserving costs. The partial edge coating 56 may, for example, extend 1-20 cm from the outer longitudinally-extending edge of the release sheet 52, and otherwise should be wide enough so that it releasably-contacts the exposed waterproofing adhesive edge portions (or "beads") designated at 24 in FIG. 17.

Figure 18:
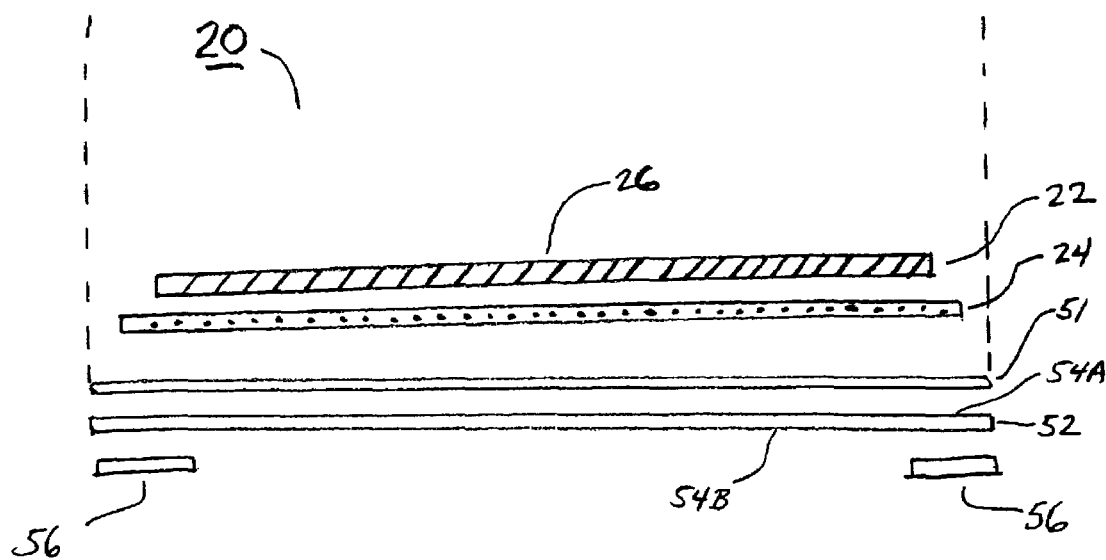
FIG. 18 is an exploded perspective illustration of another exemplary embodiment of the invention.

FIG. 18 is an exploded, perspective illustration of various components of exemplary waterproofing membranes (including roofing underlayments) 20 of the present invention. In exemplary methods of the invention, the waterproofing adhesive 24 is coated or laminated onto the release sheet 52, which is preferably a kraft paper having a first face 54A that is completely coated with a silicon or wax material (and preferably the paper is coated on side 54A with polyethylene for added strength before the silicon or wax material is used); the paper further having a second face 54B whose longitudinally extending opposed edges are coated with silicon or wax material as designated at 56. The carrier sheet 24, optionally but preferably with the aforementioned skid resistant coating 26, is then attached to the waterproofing adhesive layer 24 on the major face opposite the side to which the release paper 52 is adhered. This assembly 22/24/51/52/56 is then rolled up with the release sheet 52/54B facing outwards, such that the silicon or wax coating 56 along the back edges of the release sheet 52 are rolled onto the exposed portions of the waterproofing adhesive layer 24 which extends beyond the edges of the carrier sheet 22. When the assembly 22/24/51/52/56 is unrolled for installation of the product, the waterproofing adhesive layer 24 transfers preferentially from the silicon coating 51 on the release sheet 52 onto the carrier sheet 22.

Accordingly, waterproofing membranes 20 of the invention, as illustrated in FIGS. 17 and 18, comprise a carrier sheet 22, a waterproofing adhesive layer 24, and release sheet 52, wherein the width of the carrier sheet 22 is less than the width of the waterproofing adhesive layer 24, and wherein the width of the waterproofing adhesive layer 24 is less than or equal to the width of the release sheet 52; the waterproofing adhesive layer 24 being positioned within the waterproofing membrane 20 such that each of its two longitudinally-extending edges extends beyond the longitudinally-extending edges of the carrier sheet 22. The release sheet 52 is not folded along its edges; it is fully coated on one side 54A with a silicon or wax coating (preferably laid over an optional polyethylene coating on the paper release sheet 52), and on the back side 54B it has a silicon or wax coating strips 56 extending along each of the two width edges, whereby a substantial face of the back 54B of the paper release sheet 54B is uncoated. Each of the back strip release coatings 56 should be equal to or wider than the width of exposed waterproofing adhesive layer 24, which extends beyond the width of the carrier sheet 22.

Figure 19:
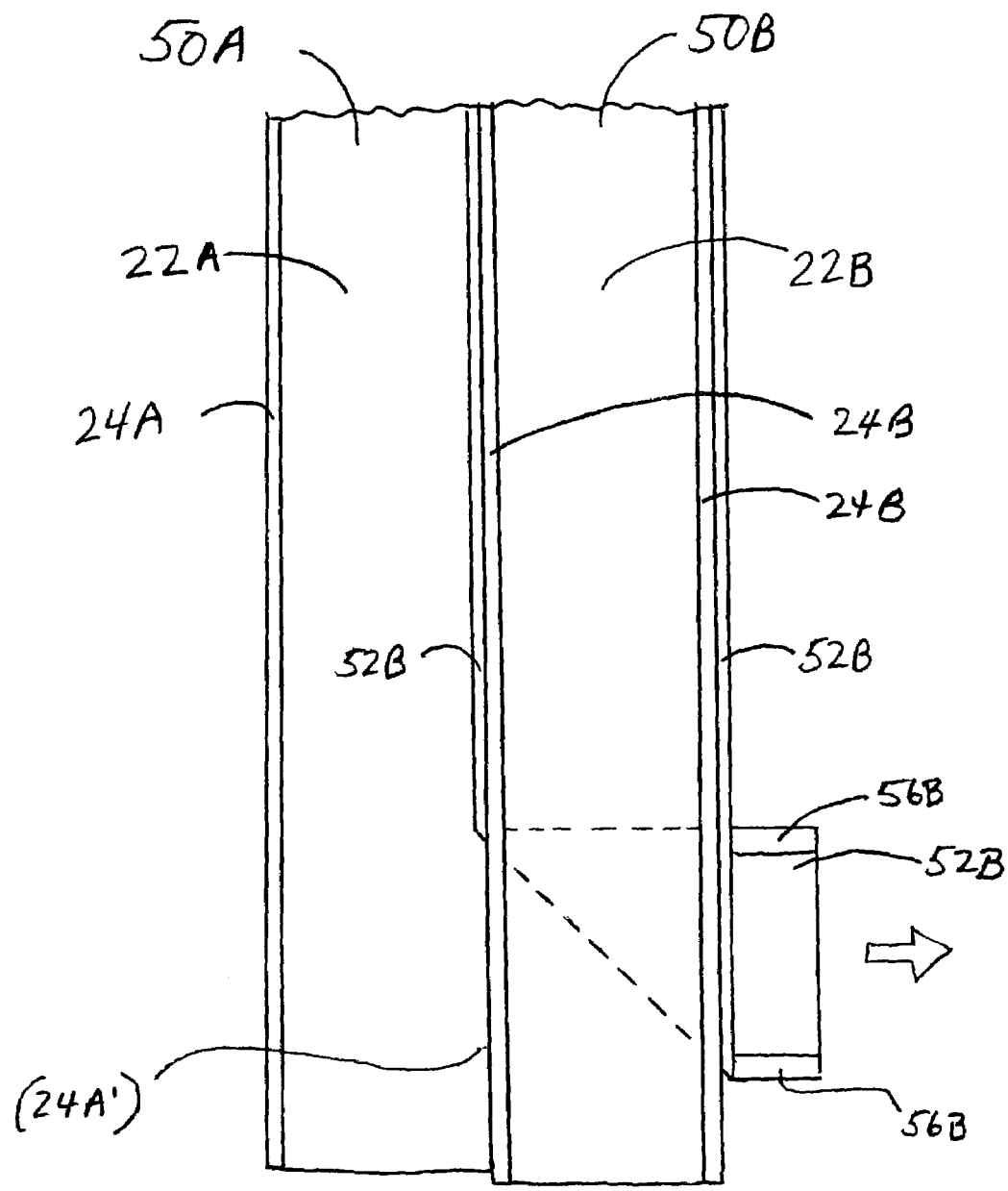
FIG. 19 is an illustration of an exemplary method of the invention whereby one waterproofing membrane is installed overlapping an installed waterproofing membrane.

As illustrated in FIG. 19, an exemplary method of the invention permits fast and accurate placement of exemplary waterproofing membranes 50A and 50B. A first waterproofing membrane 50A is attached to the desired surface, with the carrier sheet 22A side on top, and having longitudinally-extending exposed edges of the waterproofing adhesive 24A (as shown on the left side of the drawing). A second waterproofing membrane 50B of the invention can be accurately placed into overlap position along one of the longitudinally-extending edges of the installed membrane 50A. The release liner 52B as described above facilitates convenient and accurate placement of the membrane 50B because the overlapping strip portion 56B on the backside of the release sheet 52B provides releasability when positioned over the corresponding exposed waterproofing strip 24A' of the installed first membrane 52A. The release liner 52B can then be conveniently pulled in a lateral direction (shown by arrow) such that the entire face of the membrane 50B can be attached onto the building surface as well as onto the edge (24A') of the first membrane 50A. The ability of the present invention to avoid the prior art use of folds in the release sheet facilitates the ability of the release sheet 52B to tuck and curl under itself when removed from the waterproofing membrane 50B. Thus, the membrane 50B can be positioned and repositioned until accurate placement is achieved; and the liner sheet 52B removed in swift fashion, without creating undue distortion or movement to the membrane 50B once positioned into place.

Preferably, the waterproofing membranes 50A and/or 50B further comprise the skid-resistant coatings previously described in the above specification. The skid-resistant coating may be applied onto the carrier film by the screening or gravure methods of the present invention. Alternatively, the carrier film may have a granular (sand) coating or embossed polymer coating instead of the screened or gravure roll applied coating.

Hence, an exemplary method of the present invention comprises installing a first waterproofing membrane onto a building or civil engineering surface, said first waterproofing membrane having a first carrier sheet and a first waterproofing adhesive layer which extends beyond the edges of said first carrier sheet and thus provides an exposed waterproofing bead portion; and overlapping onto said exposed waterproofing bead portion a second waterproofing membrane comprising a second carrier sheet and a second waterproofing adhesive layer which extends beyond the edges of said second carrier sheet, said second waterproofing membrane having releasably attached to said second waterproofing adhesive layer a release sheet; said release sheet having a first major face coated with silicon or wax and being releasably attached to said second waterproofing adhesive layer, said second waterproofing adhesive layer thereby being temporarily attached to said release sheet and sandwiched between said second carrier sheet and said release sheet; said release sheet further having second major face opposite said first major face, said second major face being partially coated with silicon or wax along longitudinally-extending edges of said release sheet, said partial coatings operative to provide releasable contact with said exposed waterproofing bead portion of said first waterproofing membrane (when said second membrane is positioned overlapping the edge of said first installed membrane.

In further exemplary methods, the release sheet 52B is pulled in a lateral direction away from the second waterproofing membrane 50B, thereby allowing said second membrane 50B to be overlapped in direct contact with said first waterproofing membrane 50A. In still further exemplary methods, the first and second waterproofing membranes 50A and 50B further comprise a skid-resistant coating on their respective carrier sheets 22A and 22B. The methods of the invention are particularly useful when installing long sheets, in horizontal fashion, on sloped roofs. However, it is envisioned that the method can be applied to horizontal, vertical, and sloped surfaces as well. For methods involve installation of roofing underlayments, the first membrane 50A is installed horizontally along the eve, and the second membrane 50B is positioned adjacent and above the first membrane 50A and overlapped along the upper edge of the first membrane 50A. Preferably, an optional but preferred slip-resistant coating (not illustrated in FIG. 19) will allow an applicator to walk on the membranes once they are attached to the building structure.

The foregoing exemplary embodiments are provided for illustrative purposes only, and are not intended to limit the scope of the invention.

We claim:

1. A process for making a waterproofing membrane for a roof surface comprising:

providing a carrier sheet constructed of a plastic film, woven fabric, or nonwoven fabric, said carrier sheet having a first major face which, in use, will be exposed to foot traffic and a second major face which, in use, will be adhered to a roof surface;

providing on said first major face of said carrier sheet a skid-resistant polymer in a repeating pattern of shapes by depositing said polymer through a transfer process comprising (A) contacting said polymer upon a circumferential surface of a gravure roll having a cylindrical body, said circumferential surface having an image portion and a non-image portion, said image portion defined by a plurality of cell openings etched, incised, or indented into said circumferential surface, said plurality of cell openings having at least two different average depths, and (B) wiping said circumferential surface continuously with a doctor blade whereby said gravure roll is operative to transfer in one step onto said carrier sheet first major face (i) a continuous base coating formed by residual polymer wiped by said doctor blade against said non-image portion of said circumferential surface and (ii) a pattern formed by polymer wiped into said plurality of cell openings of said image portion by said doctor blade; and thereafter applying a coating of finely divided particulate material to said polymer deposited on said carrier sheet first major face, and attaching on said second major face of said carrier sheet a self-adhesive, continuous bituminous or synthetic waterproofing adhesive layer operative to adhere said second major face to a roof surface and provide a moisture seal, said waterproofing adhesive layer having a thickness no less than 5 mils and no greater than 100 mils, and wherein said skid-resistant polymer on said first major face is operative to provide skid-resistance to foot traffic when said waterproofing membrane is installed on a roof surface.

2. The process of claim 1 wherein said cells are comprised of truncated pyramids.

3. The process of claim 1 wherein one set of said cells of at least two different average depths are arranged to provide an image, and the second set of said cells of at least two different depths are used to provide a base coating layer on the carrier sheet.

4. The process of claim 1 wherein said carrier sheet is a nonwoven fabric.

5. The process of claim 1 wherein said image portion has shapes selected from the group consisting of triangles, rectangles, squares, cones, diamonds and truncated pyramids.

6. The process of claim 1 wherein said carrier layer is a film, woven fabric, or non-woven fabric, and said skid-resistant polymer is selected from the group consisting of polypropylene, polyethylene, polyvinyl acetate, ethylene-propylene copolymer, and mixtures thereof.

7. The process of claim 6 wherein said skid-resistant polymer has a lower Young's modulus of elasticity than the material comprising said carrier sheet.

8. The process of claim 1 further comprising using a nip roller to embed the coated finely divided particulate material into said skid-resistant polymer.

9. The process of claim 1 wherein said waterproofing adhesive layer is removably attached to a release sheet.

* * * * *